United States Patent
Makino et al.

(10) Patent No.: US 11,675,164 B2
(45) Date of Patent: Jun. 13, 2023

(54) IMAGING LENS SYSTEM AND IMAGING DEVICE

(71) Applicant: Maxell, Ltd., Kyoto (JP)

(72) Inventors: Yutaka Makino, Otokuni-gun (JP); Takashi Sugiyama, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 329 days.

(21) Appl. No.: 16/760,624

(22) PCT Filed: Nov. 7, 2018

(86) PCT No.: PCT/JP2018/041345
§ 371 (c)(1),
(2) Date: Apr. 30, 2020

(87) PCT Pub. No.: WO2019/093377
PCT Pub. Date: May 16, 2019

(65) Prior Publication Data
US 2021/0181468 A1    Jun. 17, 2021

(30) Foreign Application Priority Data
Nov. 10, 2017  (JP) .............................. JP2017-217376

(51) Int. Cl.
*G02B 13/18* (2006.01)
*G02B 9/60* (2006.01)
(Continued)

(52) U.S. Cl.
CPC ........... *G02B 13/0035* (2013.01); *G02B 9/12* (2013.01); *G02B 9/60* (2013.01); *G02B 13/0045* (2013.01); *G02B 13/04* (2013.01); *G02B 13/18* (2013.01)

(58) Field of Classification Search
CPC ... G02B 9/00; G02B 9/04; G02B 9/08; G02B 9/18; G02B 9/20; G02B 13/00;
(Continued)

(56) References Cited

U.S. PATENT DOCUMENTS 4,806,001 A    2/1989   Okabe et al.
6,304,389 B1   10/2001  Shibayama
(Continued)

FOREIGN PATENT DOCUMENTS

CN    1282881 A      2/2001
JP    S62-173415 A   7/1987
(Continued)

OTHER PUBLICATIONS

Dec. 8, 2020 Office Action issued in Japanese Patent Application No. 2019-552351.
(Continued)

*Primary Examiner* — Thong Q Nguyen
(74) *Attorney, Agent, or Firm* — Oliff PLC

(57) ABSTRACT

An imaging lens system and an imaging device capable of capturing a long-distance image in a central direction of an optical axis with high resolution and capturing a neighborhood image at a wide angle. An imaging lens system includes, in order from an object side: a first lens group including at least a first lens, a second lens, and a third lens; an aperture stop (STOP); and a second lens group including two or more lens and having a positive combined power, an image side of the first lens has a concave surface, a combined focal length of the first lens and the second lens is negative, the third lens is a lens having a positive power, an object side of the first lens has an aspherical surface, and an incident-side surface (object side) of the first lens has an inflection point.

9 Claims, 11 Drawing Sheets

(51) Int. Cl.
  *G02B 13/00* (2006.01)
  *G02B 9/12* (2006.01)
  *G02B 13/04* (2006.01)

(58) Field of Classification Search
  CPC .............. G02B 13/001; G02B 13/0015; G02B 13/0045; G02B 13/006; G02B 13/04; G02B 13/18; G02B 9/60; G02B 9/62; G02B 9/64; G02B 13/002
  USPC ................. 359/713–717, 749–795, 745–770
  See application file for complete search history.

(56) References Cited

U.S. PATENT DOCUMENTS

| | | | | |
|---|---|---|---|---|
| 8,570,670 | B2* | 10/2013 | Kubota | G02B 13/04 359/753 |
| 2014/0240853 | A1 | 8/2014 | Kubota et al. | |
| 2015/0260962 | A1* | 9/2015 | Yamakawa | G02B 13/06 359/714 |
| 2016/0377833 | A1* | 12/2016 | Liu | G02B 13/04 359/714 |
| 2018/0017768 | A1 | 1/2018 | Betsui et al. | |
| 2018/0307000 | A1* | 10/2018 | Lai | G02B 9/04 |

FOREIGN PATENT DOCUMENTS

| | | |
|---|---|---|
| JP | 2001-042218 A | 2/2001 |
| JP | 2004-226691 A | 8/2004 |
| JP | 2004-258132 A | 9/2004 |
| JP | 2014-164287 A | 9/2014 |
| JP | 2014-178624 A | 9/2014 |
| JP | 2016-133599 A | 7/2016 |
| WO | 2016/121550 A1 | 8/2016 |

OTHER PUBLICATIONS

Jun. 8, 2021 Office Action issued in Japanese Patent Application No. 2019-552351.
Jun. 25, 2021 Office Action issued in Chinese Patent Application No. 201880073051.3.
Jan. 15, 2019 International Search Report issued in International Patent Application No. PCT/JP2018/041345.

* cited by examiner

IMAGING LENS SYSTEM AND IMAGING DEVICE

TECHNICAL FIELD

The present invention relates to an imaging lens system and an imaging device.

BACKGROUND ART

A focal length is necessary to be short and an object to be photographed is necessary to be made small so as to achieve a horizontal angle of view of 100 degrees to ensure a wide range of image, and the focal length is necessary to be made long so as to enlarge the object to be photographed.

For example, Patent Literature 1 discloses a wide angle lens which includes, in order from an object to an image, a first lens having a negative power, a second lens having a positive power, a third lens having a negative power, a fourth lens having a negative power, and a fifth lens having a positive power, and in which a concave lens having a negative power is arranged on the first lens and a convex lens having a positive power is arranged on the second lens.

In recent years, the use of wide angle lenses mounted on a vehicle has changed from viewing to sensing. Since resolution for image analysis is required in the sensing, a high-resolution image corresponding to a megapixel has been required. Further, a wide angle of view has been also required.

As described above, an in-vehicle imaging device is required to capture a distant image in a traveling direction with high resolution and to capture a neighborhood image at a wide angle.

In addition, Patent Literature 2 discloses a zooming lens including, in order from an object side, at least three lens groups of a first lens group having a rear surface of a convex shape on an object side and having a negative refractive power, a second lens group having a front surface of a convex shape on the object side having a positive refractive power, and a third lens group arranged behind the second lens group, the zooming lens being a lens system which is zoomed by changing a distance between the lens groups 1 to 3 and satisfying a predetermined conditional expression by moving at least the second lens group and the third lens group.

CITATION LIST

Patent Literature

Patent Literature 1: Japanese Unexamined Patent Application Publication No. 2014-178624
Patent Literature 2: Japanese Unexamined Patent Application Publication No. 2004-226691

SUMMARY OF INVENTION

Technical Problem

However, in order to satisfy both requirements of capturing a long-distance image in a central direction of an optical axis with high resolution and capturing a neighborhood image at a wide angle, two lenses of a wide angle lens and a telephoto lens should be generally used. In Patent Literature 2, the zooming lens is zoomed by moving the second lens group and the third lens, and thus the capturing of an image at a long distance and the capturing of an image at a wide angle can hardly be performed simultaneously.

As for a focal length, the focal length is made short to widen an angle of view. The focal length should be made long to narrow the angle of view. In a case of photographing a distant object with a large size, it is necessary to obtain a telephoto effect by making the focal length long, but a wide range can hardly be photographed. Attempting to widen the angle of view is to shorten the focal length, but in this case, incompatible conditions can hardly be satisfied unless a distant object can be enlarged.

As described above, one imaging lens system is difficult to capture the long-distance image in the central direction of the optical axis with high resolution and to capture the neighborhood image at a wide angle.

Solution to Problem

An imaging lens system of an embodiment, in order from an object side, includes: a first lens group including at least a first lens, a second lens, and a third lens; an aperture stop; and a second lens group including two or more lenses and having a positive combined power, an image side of the first lens has a concave surface, a combined power of the first lens and the second lens is negative, the third lens is a lens having a positive power, an object side of the first lens has an aspherical surface, and an incident-side surface (object side) of the first lens has an inflection point.

According to the imaging lens system of the embodiment, since the incident-side surface (object side) of the first lens has the inflection point, a long-distance image in a central direction of an optical axis can be captured with high resolution, and a neighborhood image can be captured at a wide angle.

Preferably, in the imaging lens system of the embodiment, the first lens may be closest to the object side in the first lens group, and the imaging lens system may satisfy Conditional Expressions (1) and (2) given below.

$$0.31 \leq L1H/L1R \leq 0.65 \quad (1)$$

$$0.03 \leq L1SAG/L1R \quad (2)$$

L1H: distance from optical axis to inflection point in a direction perpendicular to the optical axis
L1R: effective radius of incident-side surface of the first lens L1
L1SAG: sag amount at inflection point on incident-side surface of the first lens L1

When the above expressions are satisfied, it is possible to ensure, with good balance, a region where the long-distance image in the central direction of the optical axis is captured with high resolution and a region where the neighborhood image is captured at a wide angle.

Preferably, the imaging lens system of the embodiment may satisfy Conditional Expression (3) given below when a refractive index nd of the first lens is defined as L1N at d-line.

$$L1N \geq 1.75 \quad (3)$$

According to the imaging lens system of the embodiment, when the above expression is satisfied, it is possible to obtain a refractive power sufficient to capture the long-distance image in the central direction of the optical axis with high resolution and to capture the neighborhood image at a wide angle.

Preferably, the imaging lens system of the embodiment may be a wide angle lens having an angle of view of 80 degrees or more.

Preferably, in the imaging lens system of the embodiment, the first lens may be a concave meniscus lens having a convex shape on the object side.

Preferably, the imaging lens system of the embodiment may satisfy Conditional Expression (4) given below when an Abbe number of the first lens is defined as L1V.

$$L1V \geq 38 \tag{4}$$

Preferably, in the imaging lens system of the embodiment, the second lens group may include one or more sets of cemented lenses.

According to the imaging lens system of the embodiment, it is possible to perform chromatic aberration correction sufficient to capture the long-distance image in the central direction of the optical axis with high resolution and to capture the neighborhood image at a wide angle.

Preferably, in the imaging lens system of the embodiment, a lens closest to the image side in the second lens group may be an aspherical surface lens having a concave shape on the object side.

Preferably, in the imaging lens system of the embodiment, a lens closest to the object side in the second lens group may have a positive power.

According to the imaging lens system of the embodiment, it is possible to capture a long-distance image in a central direction of an optical axis with high resolution, and to capture a neighborhood image at a wide angle.

Preferably, in the imaging lens system of the embodiment, the second lens group may include a cemented lens.

An imaging device according to an embodiment, in order from an object side, includes: a first lens group including at least a first lens, a second lens, and a third lens; an aperture stop; and a second lens group including two or more lenses and having a positive combined power, an image side of the first lens has a concave surface, a combined power of the first lens and the second lens is negative, the third lens is a lens having a positive power, and an object side of the first lens has an aspherical surface.

According to the imaging device of the embodiment, when the above expressions are satisfied, it is possible to ensure, with good balance, a region where the long-distance image in the central direction of the optical axis is captured with high resolution and a region where the neighborhood image is captured at a wide angle.

Advantageous Effects of Invention

According to the imaging lens system and the imaging device of the present invention, it is possible to capture a long-distance image in a central direction of an optical axis with high resolution, and to capture a neighborhood image at a wide angle.

DESCRIPTION OF EMBODIMENTS

Examples of the present invention will be described below with reference to the drawings.

Example 1: Imaging Lens System

Figure 1:
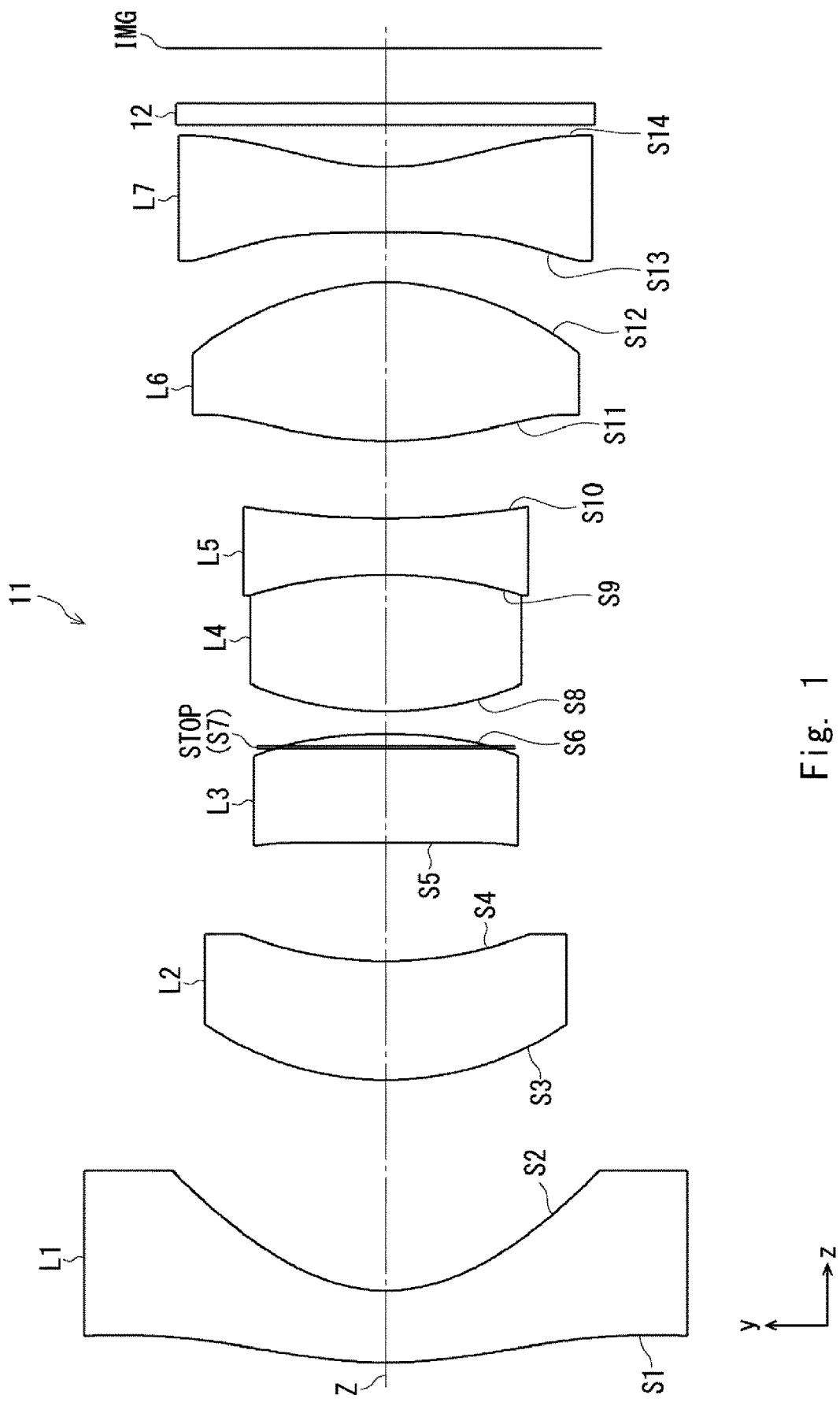
FIG. 1 is a cross-sectional view of an imaging lens system according to Example 1.

FIG. 1 is a cross-sectional view of an imaging lens system according to Example 1. In FIG. 1, an imaging lens system 11 includes, in order from an object side, a first lens L1, a second lens L2, a third lens L3, an aperture stop STOP, a fourth lens L4, a fifth lens L5, a sixth lens L6, and a seventh lens L7. The imaging lens system 11 forms an imaging lens system including, in order from the object side, a first lens group (the first lens L1, the second lens L2, and the third lens L3) including one or more lenses, the aperture stop, and a second lens group (the fourth lens L4 and the fifth lens L5) including two or more lenses and having positive combined power. An image side of the first lens has a concave surface, a combined power of the first lens and the second lens is negative, the third lens is a lens having a positive power, and an object side of the first lens has an aspherical surface.

Further, the imaging lens system 11 may include an IR cut filter 12. In addition, a reference symbol IMG indicates an image plane.

Each configuration will be described below.

The first lens L1 is an aspherical surface lens having a negative power. An object-side lens surface S1 of the first lens L1 has a convex curved surface on the object side. An image-side lens surface S2 of the first lens L1 has a concave curved surface on the object side. In addition, the first lens L1 is desirably a concave meniscus lens having a convex curved surface on the object side.

The second lens L2 is a lens having a positive power. An object-side lens surface S3 of the second lens L2 has a convex curved surface on the object side. In addition, an image-side lens surface S4 of the second lens L2 has a concave curved surface on the object side.

The third lens L3 is an aspherical surface lens having a positive power. An object-side lens surface S5 of the third lens L3 has a concave curved surface on the image side. In addition, an image-side lens surface S6 of the third lens L3 has a convex curved surface on the image side.

The aperture stop STOP adjusts the amount of light passing therethrough. For example, the aperture stop STOP is preferably formed in a shape of a plate having a hole. As shown in FIG. 1, the aperture stop STOP may be located so as to overlap with the image-side lens surface S6 of the third lens L3 in a Z direction of an optical axis.

The fourth lens L4 is a lens having a positive power. An object-side lens surface S8 of the fourth lens L4 has a convex curved surface on the object side. In addition, an image-side lens surface S9 of the fourth lens L4 has a convex curved surface on the image side.

The fifth lens L5 is a lens having a negative power. An object-side lens surface of the fifth lens L5 has a shape corresponding to the image-side lens surface S9 of the fourth lens L4, and has a concave curved surface on the image side. In addition, an image-side lens surface S10 of the fifth lens L5 has a concave curved surface on the object side. The image-side lens surface of the fourth lens L4 and the object-side lens surface of the fifth lens L5 are cemented together with an ultraviolet curing adhesive, and the fourth lens L4 and the fifth lens L5 form a cemented lens.

The sixth lens L6 is an aspherical surface lens having a positive power. An object-side lens surface S11 of the sixth lens L6 has a convex curved surface on the object side. In addition, an image-side lens surface S12 of the sixth lens L6 has a convex curved surface on the image side.

The seventh lens L7 is an aspherical surface lens having a negative power. An object-side lens surface S13 of the seventh lens L7 has a concave curved surface on the image side. In addition, an image-side lens surface S14 of the seventh lens L7 has a concave curved surface on the object side.

The IR cut filter 12 is a filter that cuts infrared light.

Characteristic data of the imaging lens system 11 will be described below.

First, Table 1 indicates lens data for each lens surface of the imaging lens system 11. In Table 1, a radius of curvature, a surface distance, a refractive index, and an Abbe number for each surface are presented as the lens data.

TABLE 1

| Example 1 | | Lens parameter | | |
|---|---|---|---|---|
| | | Radius of curvature | Distance | Nd (refractive index) | vd (abbe number) |
| First surface | * | 6.575 | 1.000 | 1.77250 | 49.5 |
| Second surface | * | 2.304 | 2.952 | | |

TABLE 1-continued

| Example 1 | | Lens parameter | | |
|---|---|---|---|---|
| | | Radius of curvature | Distance | Nd (refractive index) | vd (abbe number) |
| Third surface | | 4.486 | 1.671 | 1.72916 | 54.7 |
| Fourth surface | | 5.636 | 1.653 | | |
| Fifth surface | * | 55.769 | 1.524 | 1.82115 | 24.1 |
| Sixth surface | * | −6.780 | −0.198 | | |
| Seventh surface (stop) | | Infinity | 0.506 | | |
| Eighth surface | | 4.791 | 1.911 | 1.49710 | 81.6 |
| Ninth surface | | −6.565 | 0.800 | 1.94595 | 18.0 |
| Tenth surface | | 12.632 | 1.077 | | |
| Eleventh surface | * | 5.478 | 2.223 | 1.58313 | 59.5 |
| Twelfth surface | * | −3.385 | 0.706 | | |
| Thirteenth surface | * | −17.785 | 0.907 | 1.58313 | 59.5 |
| Fourteenth surface | * | 3.514 | 0.600 | | |
| Fifteenth surface | | Infinity | 0.300 | 1.51680 | 64.2 |
| Sixteenth surface | | Infinity | 0.751 | | |

A first surface S1, a second surface S2, a fifth surface S5, a sixth surface S6, an eleventh S11, a twelfth surface S12, a thirteenth surface S13, and a fourteenth surface S14 are odd aspherical surfaces of 16-th order, and a sag amount Sag for each surface is represented by the following Equation. The sag amount is a distance in a direction parallel to the optical axis Z, between a point at which a straight line parallel to the optical axis Z and having a height h from the optical axis Z intersects with the lens and a plane perpendicular to the optical axis Z passing through a surface vertex which is an intersection of the lens surface and the optical axis Z.

$$\text{Sag}(h) = (h^2/R)/\{1+\sqrt{(1-(1+k) \times h^2/R^2)}\} + A3 \times h^3 + A4 \times h^4 + A5 \times h^5 + A6 \times h^6 + A7 \times h^7 + A8 \times h^8 + A10 \times h^{10} \pm A12 \times h^{12} + A14 \times h^{14} + A16 \times h^{16}$$

however, h: vertical height from the optical axis

Sag(h): distance (sag amount) along the optical axis from a tangent plane at a vertex of the aspherical surface to a position on the aspherical surface at a height h R: radius of curvature of lens surface k: conical coefficient An: aspherical coefficient of n-th order Table 2 indicates aspherical coefficients for defining an aspherical shape of an aspherical lens surface in the imaging lens system 11 of Example 1. In Table 2, for example, "−6.522528E-03" means "$-6.522528 \times 10^{-3}$".

TABLE 2

| Example 1 | | Aspherical coefficient | | | | | | |
|---|---|---|---|---|---|---|---|---|
| | First surface | Second surface | Fifth surface | Sixth surface | Eleventh surface | Twelfth surface | Thirteenth surface | Fourteenth surface |
| k | −2.7316E+00 | −1.2005E+00 | −4.1625E+03 | 6.7030E−01 | −2.3479E+00 | −1.0423E+01 | 0.0000E+00 | 0.0000E+00 |
| A3 | −3.9946E−03 | −4.3852E−03 | 0.0000E+00 | 0.0000E+00 | 0.0000E+00 | 0.0000E+00 | 1.3336E−02 | 1.4941E−03 |
| A4 | −3.1571E−03 | 1.3618E−03 | −2.2433E−03 | −2.9101E−03 | −1.5170E−03 | −1.5667E−02 | −3.6467E−03 | −1.4540E−02 |
| A5 | 1.1736E−04 | 1.9355E−04 | 0.0000E+00 | 0.0000E+00 | 0.0000E+00 | 0.0000E+00 | −1.0586E−02 | −3.9872E−03 |
| A6 | 3.5875E−05 | −2.7316E−04 | −1.0045E−03 | −4.5019E−04 | −5.7959E−04 | 3.5997E−03 | 1.4569E−03 | 5.3040E−04 |
| A7 | 1.3417E−05 | 5.4196E−05 | 0.0000E+00 | 0.0000E+00 | 0.0000E+00 | 0.0000E+00 | 1.4807E−03 | 7.1190E−04 |
| A8 | −1.9196E−06 | 0.0000E+00 | −1.9488E−04 | 1.1064E−05 | 1.0902E−04 | −7.8549E−04 | −2.9841E−04 | −1.6466E−04 |
| A10 | 0.0000E+00 | 0.0000E+00 | 1.0316E−04 | 3.8889E−06 | −1.4066E−05 | 1.0941E−04 | 0.0000E+00 | 0.0000E+00 |
| A12 | 0.0000E+00 | 0.0000E+00 | −1.4285E−06 | 1.1289E−06 | −2.1870E−06 | −9.0804E−06 | 0.0000E+00 | 0.0000E+00 |
| A14 | 0.0000E+00 | 0.0000E+00 | −8.4933E−06 | −1.4052E−06 | 5.4863E−07 | 3.2219E−07 | 0.0000E+00 | 0.0000E+00 |
| A16 | 0.0000E+00 | 0.0000E+00 | 1.2647E−06 | 2.0912E−07 | −2.7483E−08 | 1.4647E−09 | 0.0000E+00 | 0.0000E+00 |

Figure 2:
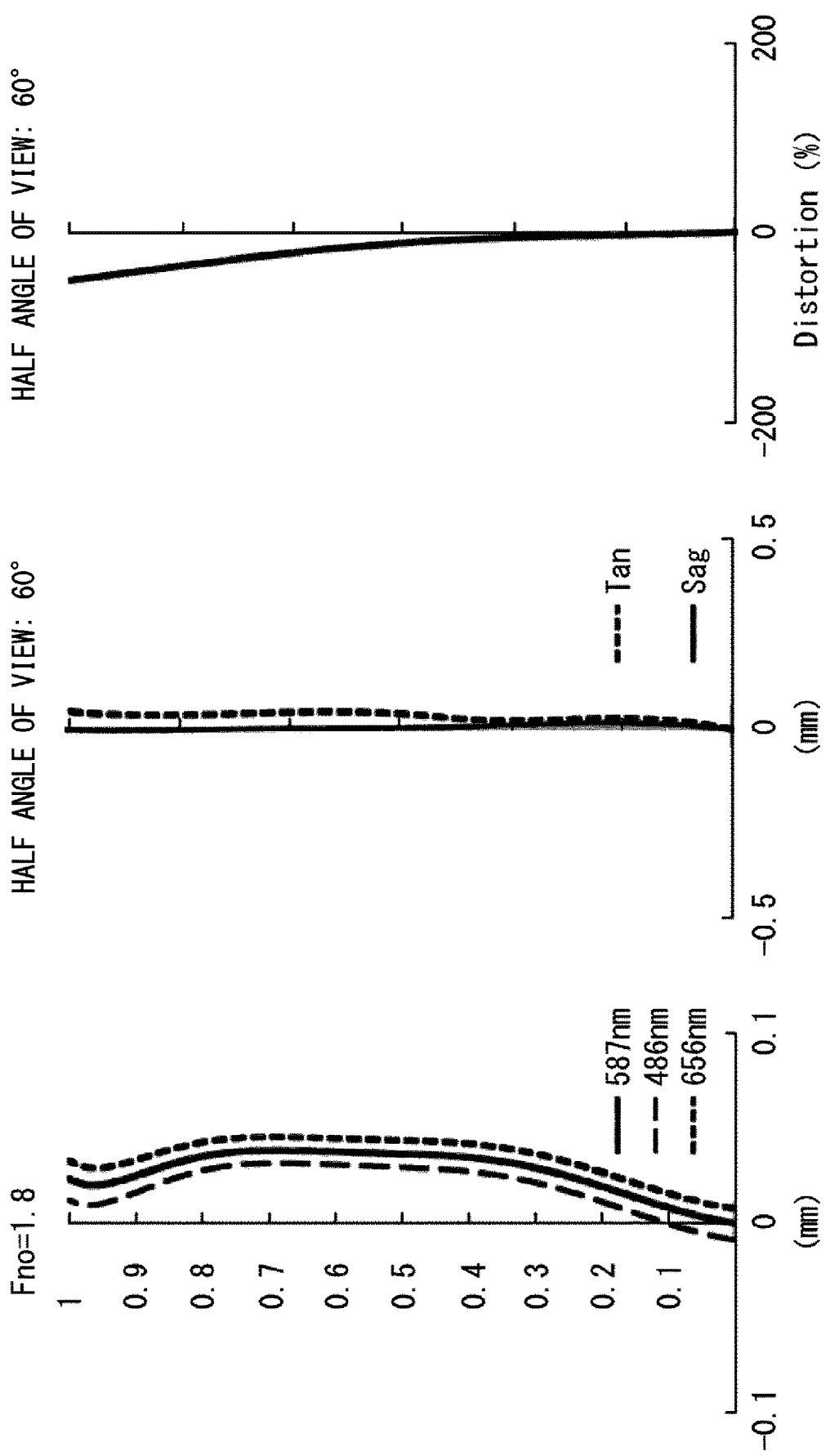
FIG. 2 is a longitudinal aberration graph, a field curvature graph, a distortion graph in the imaging lens system of Example 1.

FIG. 2 is a longitudinal aberration graph, a field curvature graph, a distortion graph in the imaging lens system of Example 1. As shown in FIG. 2, a half angle of view is 60°, and an F value is 1.8 in the imaging lens system 11 of Example 1. In the longitudinal aberration graph of FIG. 2, a horizontal axis represents a position where a light ray crosses the optical axis Z, and a vertical axis represents a height at a pupil diameter. The longitudinal aberration graph of the FIG. 2 shows simulation results using light rays having wavelengths of 587 nm, 486 nm, and 656 nm.

In the field curvature graph in FIG. 2, a horizontal axis indicates a distance in the Z direction of the optical axis, and a vertical axis indicates an image height (an angle of view). In the field curvature graph of FIG. 2, a symbol Sag indicates a curvature of field on a sagittal plane, and a symbol Tan indicates a curvature of field on a tangential plane. As shown in field curvature graph of FIG. 2, according to the imaging lens system 11 of the present example, the curvature of field is satisfactorily corrected. Accordingly, the imaging lens system 11 has a high resolution.

In the distortion graph of the FIG. 2, a horizontal axis represents the amount of image distortion (%), and a vertical axis represents an image height (angle of view). The field curvature graph and the distortion graph of FIG. 2 show simulation results using a light ray having a wavelength of 587 nm. Generally, when the angle of view is made wide, the amount of image distortion increases as the angle of view increases. In addition, when the amount of image distortion is made small, the angle of view cannot be made wide. As shown in the distortion graph of FIG. 2, in the imaging lens system of Example 1, the angle of view can be widened, and the increase in the amount of image distortion can be prevented. Specifically, as shown in distortion graph of FIG. 2, the amount of image distortion is extremely small at a half angle of view of 10 degrees, and the increase in the amount of image distortion can be prevented even at a half angle of view of 60 degrees.

Next, Table 3 indicates a calculation result of characteristic values of the imaging lens system 11 of Example 1. When an overall focal length of the lens system is f, a focal length of the first lens L1 is $f_1$, a focal length of the second lens L2 is $f_2$, a focal length of the third lens L3 is $f_3$, a focal length of the fourth lens L4 is $f_4$, a focal length of the fifth lens L5 is $f_5$, a focal length of the sixth lens L6 is $f_6$, and a focal length of the seventh lens L7 is $f_7$ in the imaging lens system 11, Table 3 indicates these characteristic values (a combined power $f_{12}$ of the first lens L1 and the second lens L2 and a combined power $f_{45}$ of the fourth lens L4 and the fifth lens L5), $f_{12}/f$, and $f_{12}/f_3$. Various focal lengths were calculated using a light ray having a wavelength of 587 nm.

TABLE 3

| | Example 1 |
|---|---|
| Half angle of view | 60 |
| f1 | −5.1150 |
| f2 | 18.6910 |
| f12 | −7.1880 |
| f3 | 7.4440 |
| f4 | 5.9010 |
| f5 | −4.4760 |
| f6 | 3.9530 |
| f7 | −4.9540 |
| f45 | −52.2260 |
| f | 3.5330 |
| f12/f | −2.035 |
| f12/f3 | −0.966 |

In the imaging lens system of Example 1, an incident-side surface of the first lens L1 closest to the object side in the first lens group is an aspherical surface and has an inflection point, and thus the following conditional expression is satisfied.

$$0.31 \le L1H/L1R \le 0.65$$

L1H: distance from optical axis to inflection point in a direction perpendicular to the optical axis L1R: effective radius of incident-side surface of the first lens L1

L1SAG: sag amount at inflection point on incident-side surface of the first lens L1

The definition of the "effective radius of incident-side surface of L1" is "the maximum height, on the object-side surface of the first lens, of the light ray incident on a diagonal vertex of the sensor to be used".

Figure 3:
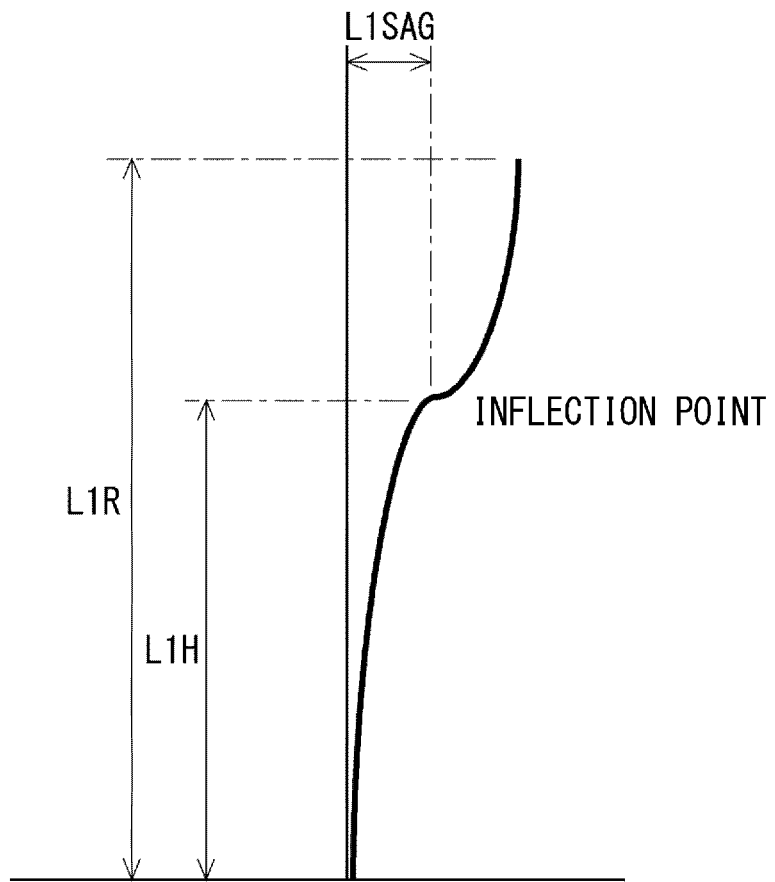
FIG. 3 is a schematic diagram illustrating an inflection point and a sag amount on an incident-side surface of the lens.

Here, L1H, L1R, and L1SAG are parameters of the lens shown in FIG. 3. FIG. 3 is a schematic diagram illustrating the inflection point and the sag amount on the incident-side surface of the lens. As shown in FIG. 3, the distance from the optical axis to the inflection point in the direction perpendicular to the optical axis is denoted by L1H. In addition, the effective radius of the object-side surface of the lens is denoted by L1R. The sag amount at the position of the inflection point on the object-side surface of the lens is denoted by L1SAG.

Figure 4:
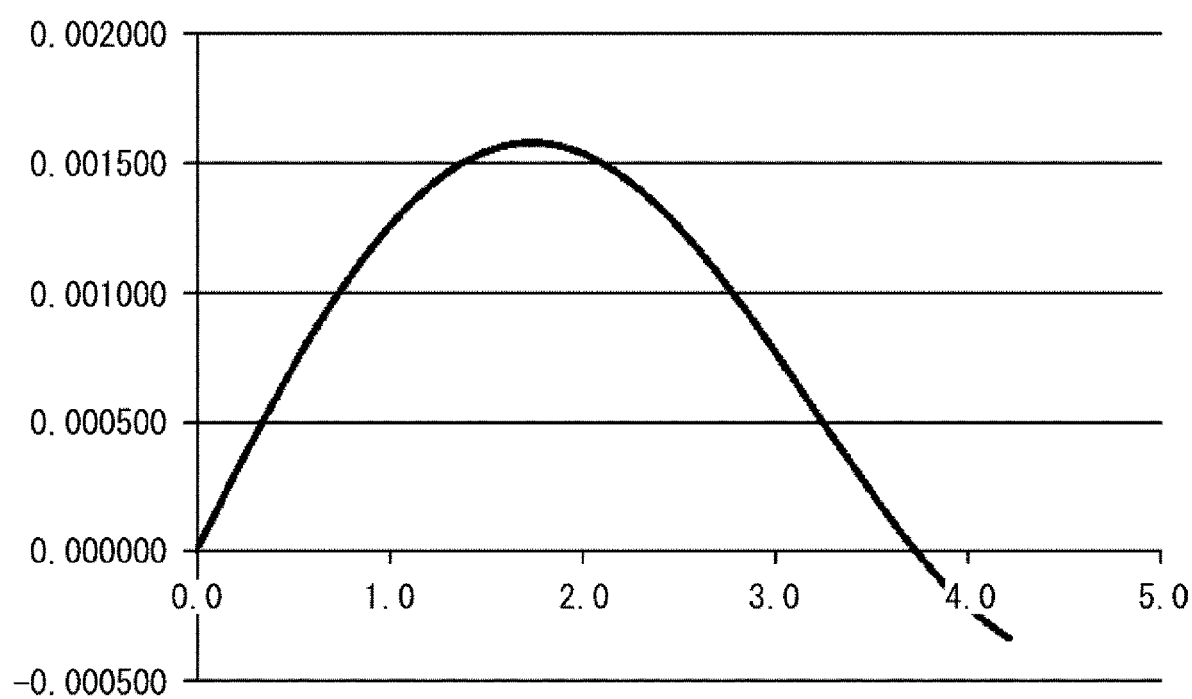
FIG. 4 is a graph showing a relation between a distance from a central optical axis and a differential value of the sag amount on an object-side lens surface of a first lens L1 of the imaging lens system in Example 1.

FIG. 4 is a graph showing a relation between a distance from a central optical axis and a differential value of the sag amount on the object-side lens surface of the first lens L1 of the imaging lens system in Example 1. In FIG. 4, a horizontal axis represents a distance in the perpendicular direction from the central optical axis, and a vertical axis represents a value obtained by differentiating the sag amount by the distance.

In the imaging lens system of Example 1 shown in FIG. 4, the first lens L1 has an effective radius of 4.22 mm and a position of an inflection point of 1.73 mm. Therefore, a value obtained by normalizing the position of the inflection point with the effective radius is 0.410, which satisfies the above expression.

Further, the imaging lens system of Example 1 satisfies the following conditional expression. In the imaging lens system of Example 1, the value of L1SAG is 0.175 and the value of L1SAG/L1R is 0.042.

$$0.03 \le L1SAG/L1R$$

As described above, according to the imaging lens system of Example 1, since the incident-side surface (object side) of the first lens has the inflection point, a long-distance image in the central direction of the optical axis can be captured with high resolution, and a neighborhood image can be captured at a wide angle. When the above expressions are satisfied, it is possible to ensure, with good balance, a region where the long-distance image in the central direction of the optical axis is captured with high resolution and a region where the neighborhood image is captured at a wide angle. In other words, when the imaging lens system of Example 1 is mounted on an vehicle, it is possible to capture a long-distance image in a traveling direction corresponding to a movement speed of the vehicle with high resolution, and to capture the neighborhood image at a wide angle of view so that a pedestrian approaching the vehicle at a walking speed from a direction perpendicular (or an approximately perpendicular angle) to the movement direction of the vehicle can be detected at a periphery of the imaging.

For example, the imaging can be performed with high resolution in a region at the center of the optical axis which is a narrow angle (for example, within 6 degrees) from the optical axis, and the imaging can be performed at the periphery at a wide angle of view of 80 degrees or more.

In addition, the imaging lens system of Example 1 desirably satisfies the following conditional expression when a refractive index nd of the first lens is a refractive index L1N at d-line.

$$L1N \geq 1.75$$

When the above expression is satisfied, the imaging lens system can obtain a refractive power sufficient to capture the long-distance image in the central direction of the optical axis with high resolution and to capture the neighborhood image at a wide angle.

In addition, the imaging lens system of Example 1 desirably satisfies the following conditional expression when the Abbe number of the first lens L1 is defined as L1V.

$$L1V \geq 38$$

In the imaging lens system of Example 1, the second lens group desirably includes one or more sets of cemented lenses. In the imaging lens system of Example 1, for example, one set of a cemented lens is configured by the fourth lens L4 and the fifth lens L5. With such a configuration, it is possible to perform chromatic aberration correction sufficient to capture the long-distance image in the central direction of the optical axis with high resolution and to capture the neighborhood image at a wide angle.

In the imaging lens system of Example 1, the lens closest to the image side in the second lens group is desirably an aspherical surface lens having a concave shape on the object side.

In the imaging lens system of Example 1, the lens closest to the object side in the second lens group desirably has a positive power.

As described above, according to the imaging lens system of Example 1, it is possible to capture the long-distance image in the central direction of the optical axis with high resolution and to capture the neighborhood image at a wide angle.

Example 2: Imaging Lens System

Figure 5:
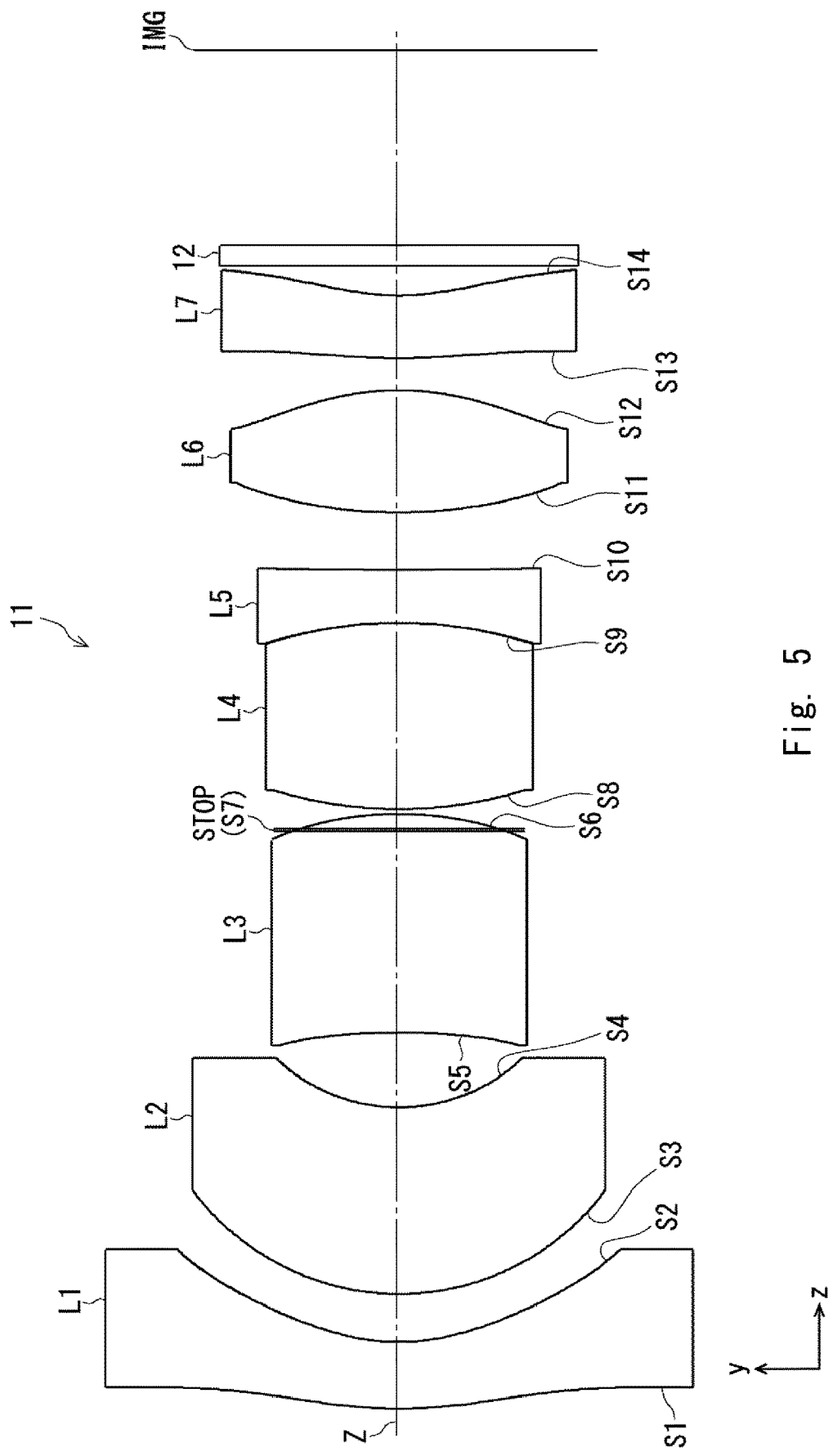
FIG. 5 is a cross-sectional view of an imaging lens system according to Example 2.
Figure 6:
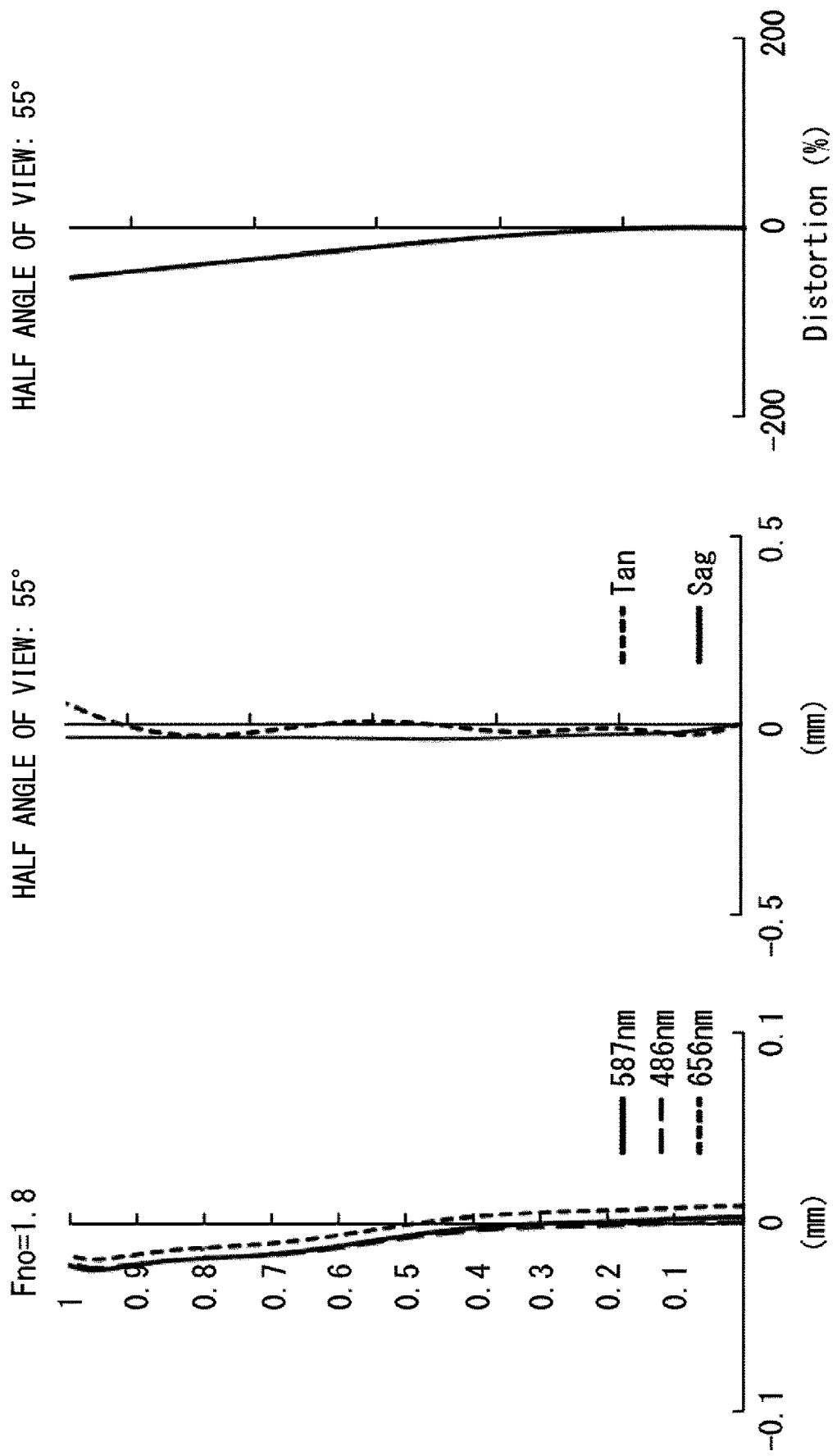
FIG. 6 is a longitudinal aberration graph, a field curvature graph, a distortion graph in the imaging lens system of Example 2.
Figure 7:
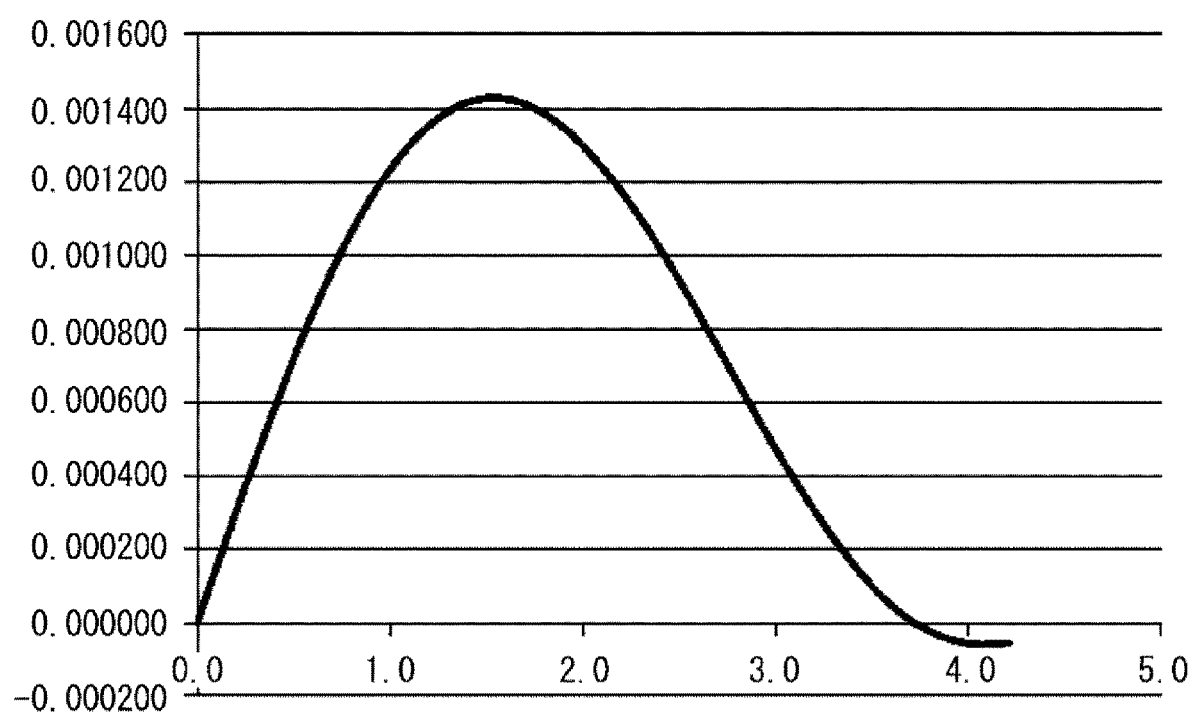
FIG. 7 is a graph showing a relation between a distance from a central optical axis and a differential value of the sag amount on an object-side lens surface of a first lens L1 of the imaging lens system in Example 2.

FIG. 5 is a cross-sectional view of an imaging lens system according to Example 2. FIGS. 5, 6, and 7 are graphs corresponding to FIGS. 1, 2, and 4 of Example 1, respectively, and the description thereof will not be presented because components shown in the drawings are the same as those in Example 1. In addition, the contents indicated in Tables 4 to 6 and the structure of the tables are the same as those in Tables 1 to 3, and thus the description of the tables will be also presented.

Characteristic data of an imaging lens system 11 will be described below.

First, Table 4 indicates lens data for each lens surface of the imaging lens system 11.

TABLE 4

| | Lens parameter | | | |
|---|---|---|---|---|
| Example 2 | | Radius of curvature | Distance | Nd (refractive index) | vd (abbe number) |
| First surface | * | 6.745 | 1.000 | 1.77250 | 49.5 |
| Second surface | * | 3.158 | 0.726 | | |
| Third surface | | 3.869 | 2.814 | 1.72916 | 54.7 |
| Fourth surface | | 2.672 | 1.133 | | |
| Fifth surface | * | −11.730 | 3.299 | 1.82115 | 24.1 |
| Sixth surface | * | −5.251 | −0.259 | | |
| Seventh surface (stop) | | Infinity | 0.337 | | |
| Eighth surface | | 6.295 | 2.814 | 1.49710 | 81.6 |
| Ninth surface | | −6.524 | 0.800 | 1.94595 | 18.0 |
| Tenth surface | | 81.914 | 0.877 | | |
| Eleventh surface | * | 7.625 | 1.839 | 1.58313 | 59.5 |
| Twelfth surface | * | −3.786 | 0.476 | | |
| Thirteenth surface | * | 9.457 | 0.955 | 1.58313 | 59.5 |
| Fourteenth surface | * | 3.773 | 0.450 | | |
| Fifteenth surface | | Infinity | 0.300 | 1.51680 | 64.2 |
| Sixteenth surface | | Infinity | 2.931 | | |

Table 5 indicates aspherical coefficients for defining an aspherical shape of an aspherical lens surface in the imaging lens system 11 of Example 2.

TABLE 5

| Example 2 | Aspherical coefficient | | | | | | | |
|---|---|---|---|---|---|---|---|---|
| | First surface | Second surface | Fifth surface | Sixth surface | Eleventh surface | Twelfth surface | Thirteenth surface | Fourteenth surface |
| k | −1.3164E+01 | −1.9984E+00 | 0.0000E+00 | −1.2776E+00 | 1.6704E+00 | −1.2851E+01 | 0.0000E+00 | 2.2566E−01 |
| A3 | 1.9897E−03 | −5.9705E−03 | 0.0000E+00 | 0.0000E+00 | 0.0000E+00 | 0.0000E+00 | −4.9415E−03 | −2.9192E−03 |
| A4 | −3.8846E−03 | 1.3948E−03 | −2.8530E−03 | −2.1923E−03 | −1.6837E−04 | −1.3959E−02 | 6.9582E−03 | −1.7274E−02 |
| A5 | 7.7823E−05 | 5.5458E−04 | 0.0000E+00 | 0.0000E+00 | 0.0000E+00 | 0.0000E+00 | −1.0326E−02 | −1.8161E−03 |
| A6 | 7.0900E−05 | −2.7302E−04 | −2.4445E−04 | −1.8841E−04 | −3.7772E−04 | 3.7007E−03 | 8.3733E−04 | 6.7446E−04 |
| A7 | 1.9909E−05 | 4.1795E−05 | 0.0000E+00 | 0.0000E+00 | 0.0000E+00 | 0.0000E+00 | 1.2836E−03 | 6.0126E−04 |
| A8 | −3.5866E−06 | 0.0000E+00 | −1.6345E−04 | 2.9253E−05 | 1.4336E−04 | −7.1212E−04 | −2.6243E−04 | −1.6625E−04 |
| A10 | 0.0000E+00 | 0.0000E+00 | 4.5600E−05 | −3.0370E−06 | −1.4841E−05 | 1.0406E−04 | 0.0000E+00 | 0.0000E+00 |
| A12 | 0.0000E+00 | 0.0000E+00 | −1.1910E−06 | 1.3006E−06 | −1.3924E−06 | −8.9253E−06 | 0.0000E+00 | 0.0000E+00 |
| A14 | 0.0000E+00 | 0.0000E+00 | −2.8829E−06 | −7.5351E−07 | 5.9317E−07 | 4.4650E−07 | 0.0000E+00 | 0.0000E+00 |
| A16 | 0.0000E+00 | 0.0000E+00 | 3.7299E−07 | 1.0351E−07 | −4.0716E−08 | −5.2746E−09 | 0.0000E+00 | 0.0000E+00 |

FIG. 6 is a longitudinal aberration graph, a field curvature graph, a distortion graph in the imaging lens system of Example 2. As shown in FIG. 6, a half angle of view is 55°, and an F value is 1.8 in the imaging lens system 11 of Example 2.

Next, Table 6 indicates a calculation result of characteristic values of the imaging lens system 11 of Example 2.

TABLE 6

| Half angle of view | Example 2 55 |
|---|---|
| f1 | −8.7090 |
| f2 | −1866.8170 |
| f12 | −6.0060 |
| f3 | 9.3160 |
| f4 | 6.9320 |
| f5 | −6.2790 |
| f6 | 4.5940 |
| f7 | −11.4310 |
| f45 | 108.8780 |
| f | 4.4440 |
| f12/f | −1.351 |
| f12/f3 | −0.645 |

In the imaging lens system of Example 2, an incident-side surface of the first lens L1 closest to the object side in the first lens group is an aspherical surface and has an inflection point, and thus the following conditional expression is satisfied.

$$0.31 \leq L1H/L1R \leq 0.65$$

L1H: distance from optical axis to inflection point in a direction perpendicular to the optical axis
L1R: effective radius of incident-side surface of the first lens L1
L1SAG: sag amount at inflection point on incident-side surface of the first lens L1

FIG. 7 is a graph showing a relation between a distance from a central optical axis and a differential value of the sag amount on the object-side lens surface of the first lens L1 of the imaging lens system in Example 2. In FIG. 7, a horizontal axis represents a distance in the perpendicular direction from the central optical axis, and a vertical axis represents a value obtained by differentiating the sag amount by the distance.

In the imaging lens system of Example 2 shown in FIG. 7, the first lens L1 has an effective radius of 4.43 mm and a position of an inflection point of 1.53 mm. Therefore, a value obtained by normalizing the position of the inflection point with the effective radius is 0.345, which satisfies the above expression.

Further, the imaging lens system of Example 2 satisfies the following conditional expression. In the imaging lens system of Example 2, the value of L1SAG is 0.140 and the value of L1SAG/L1R is 0.032.

$$0.03 \leq L1SAG/L1R$$

Figure 8:
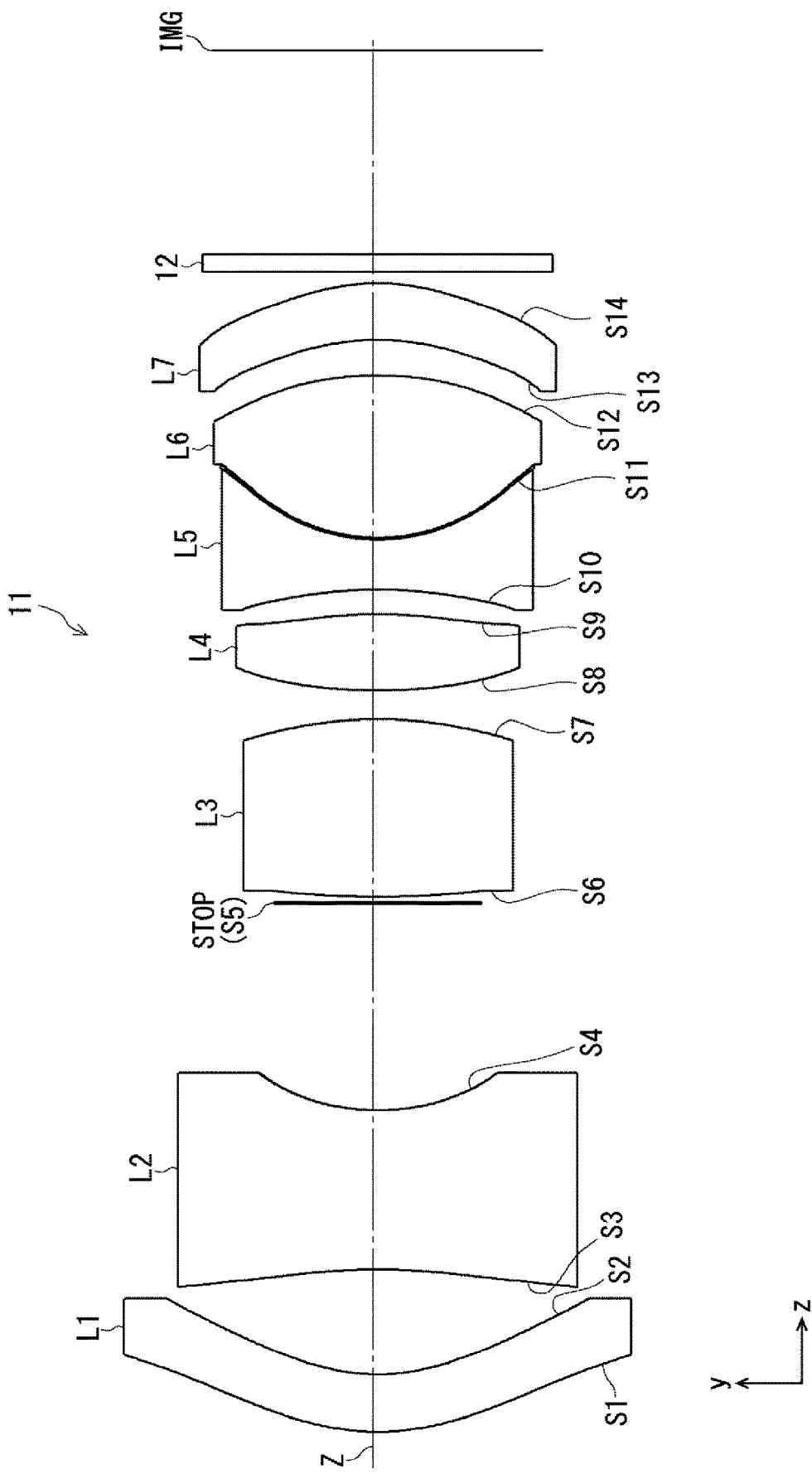
FIG. 8 is a cross-sectional view of an imaging lens system according to Example 3.

When the above expressions are satisfied, it is possible to ensure, with good balance, a region where the long-distance image in the central direction of the optical axis is captured with high resolution and a region where the neighborhood image is captured at a wide angle Example 3: Imaging Lens System FIG. 8 is a cross-sectional view of an imaging lens system according to Example 3. In FIG. 8, an imaging lens system 11 includes, in order from an object side, a first lens L1, a second lens L2, an aperture stop STOP, a third lens L3, a fourth lens L4, a fifth lens L5, a sixth lens L6, and a seventh lens L7. The imaging lens system 11 forms an imaging lens system including, in order from the object side, a first lens group (the first lens L1, the second lens L2, and the third lens L3) including one or more lenses, the aperture stop, and a second lens group (the fifth lens L5 and the sixth lens L6) including two or more lenses and having positive combined power. An image side of the first lens has a concave surface, a combined power of the first lens and the second lens is negative, the third lens is a lens having a positive power, and an object side of the first lens has an aspherical surface.

Further, the imaging lens system 11 may include an IR cut filter 12. In addition, a reference symbol IMG indicates an image plane.

Each configuration will be described below.

The first lens L1 is an aspherical surface lens having a negative power. An object-side lens surface S1 of the first lens L1 has a convex curved surface on the object side. An image-side lens surface S2 of the first lens L1 has a concave curved surface on the object side. In addition, the first lens L1 is desirably a concave meniscus lens having a convex curved surface on the object side.

The second lens L2 is an aspherical surface lens having a negative power. An object-side lens surface S3 of the second lens L2 has a concave curved surface on the image side. In addition, an image-side lens surface S4 of the second lens L2 has a concave curved surface on the object side.

The aperture stop STOP adjusts the amount of light passing therethrough. For example, the aperture stop STOP is preferably formed in a shape of a plate having a hole.

The third lens L3 is an aspherical surface lens having a positive power. An object-side lens surface S6 of the third lens L3 has a convex curved surface on the object side. In addition, an image-side lens surface S7 of the third lens L3 has a convex curved surface on the image side.

The fourth lens L4 is an aspherical surface lens having a positive power. An object-side lens surface S8 of the fourth lens L4 has a convex curved surface on the object side. In addition, an image-side lens surface S9 of the fourth lens L4 has a convex curved surface on the image side.

The fifth lens L5 is an aspherical surface lens having a negative power. An object-side lens surface S10 of the fifth lens L5 has a concave curved surface on the image side. In addition, an image-side lens surface S11 of the fifth lens L5 has a concave curved surface on the object side.

The sixth lens L6 is an aspherical surface lens having a positive power. An object-side lens surface of the sixth lens L6 has a shape corresponding to the image-side lens surface S11 of the fifth lens L5, and has a convex curved surface on the object side. In addition, an image-side lens surface S12 of the sixth lens L6 has a convex curved surface on the image side. The image-side lens surface of the fifth lens L5 and the object-side lens surface of the sixth lens L6 are cemented together with an ultraviolet curing adhesive, and the fifth lens L5 and the sixth lens L6 form a cemented lens.

The seventh lens L7 is an aspherical surface lens having a positive power. An object-side lens surface S13 of the seventh lens L7 has a concave curved surface on the image side. In addition, an image-side lens surface S14 of the seventh lens L7 has a convex curved surface on the image side.

The IR cut filter 12 is a filter that cuts infrared light.
Characteristic data of the imaging lens system 11 will be described below.

First, Table 7 indicates lens data of each lens surface of the imaging lens system 11. In Table 7, a radius of curvature, a surface distance, a refractive index, and an Abbe number for each surface are presented as the lens data.

TABLE 7

Lens parameter

| Example 3 | | Radius of curvature | Distance | Nd (refractive index) | vd (abbe number) |
|---|---|---|---|---|---|
| First surface | * | 4.515 | 1.000 | 1.80610 | 40.8 |
| Second surface | * | 3.678 | 1.858 | | |
| Third surface | * | −9.280 | 2.792 | 1.54510 | 56.2 |
| Fourth surface | * | 4.391 | 3.647 | | |
| Fifth surface (stop) | | Infinity | 0.130 | | |
| Sixth surface | | 18.015 | 3.137 | 1.80610 | 33.3 |
| Seventh surface | | −7.799 | 0.516 | | |
| Eighth surface | * | 10.611 | 1.323 | 1.54510 | 56.2 |
| Ninth surface | * | −7.653 | 0.428 | | |
| Tenth surface | * | −7.793 | 0.900 | 1.63500 | 24.0 |
| Eleventh surface | * | 3.215 | 0.020 | 1.50200 | 51.0 |
| Twelfth surface | * | 3.215 | 2.870 | 1.54510 | 56.2 |
| Thirteenth surface | * | −5.988 | 0.633 | | |
| Fourteenth surface | * | −4.394 | 1.000 | 1.68890 | 31.1 |
| Fifteenth surface | * | −3.799 | 0.200 | | |
| Sixteenth surface | | Infinity | 0.300 | 1.51680 | 64.2 |
| Seventeenth surface | | Infinity | 3.590 | | |

A first surface S1, a second surface S2, a third surface S3, a fourth surface S4, an eighth S8, a ninth S9, a tenth S10, an eleventh S11, a twelfth surface S12, a thirteenth surface S13, a fourteenth surface S14, and fifteenth surface S15 are even aspherical surfaces of 14-th order, and a sag amount Sag for each surface is represented by the equation indicated in Example 1.

Table 8 indicates aspherical coefficients for defining an aspherical shape of an aspherical lens surface in the imaging lens system 11 of Example 3. In Table 8, for example, "−6.522528E−03" means "−6.522528×10$^{-3}$".

Figure 9:
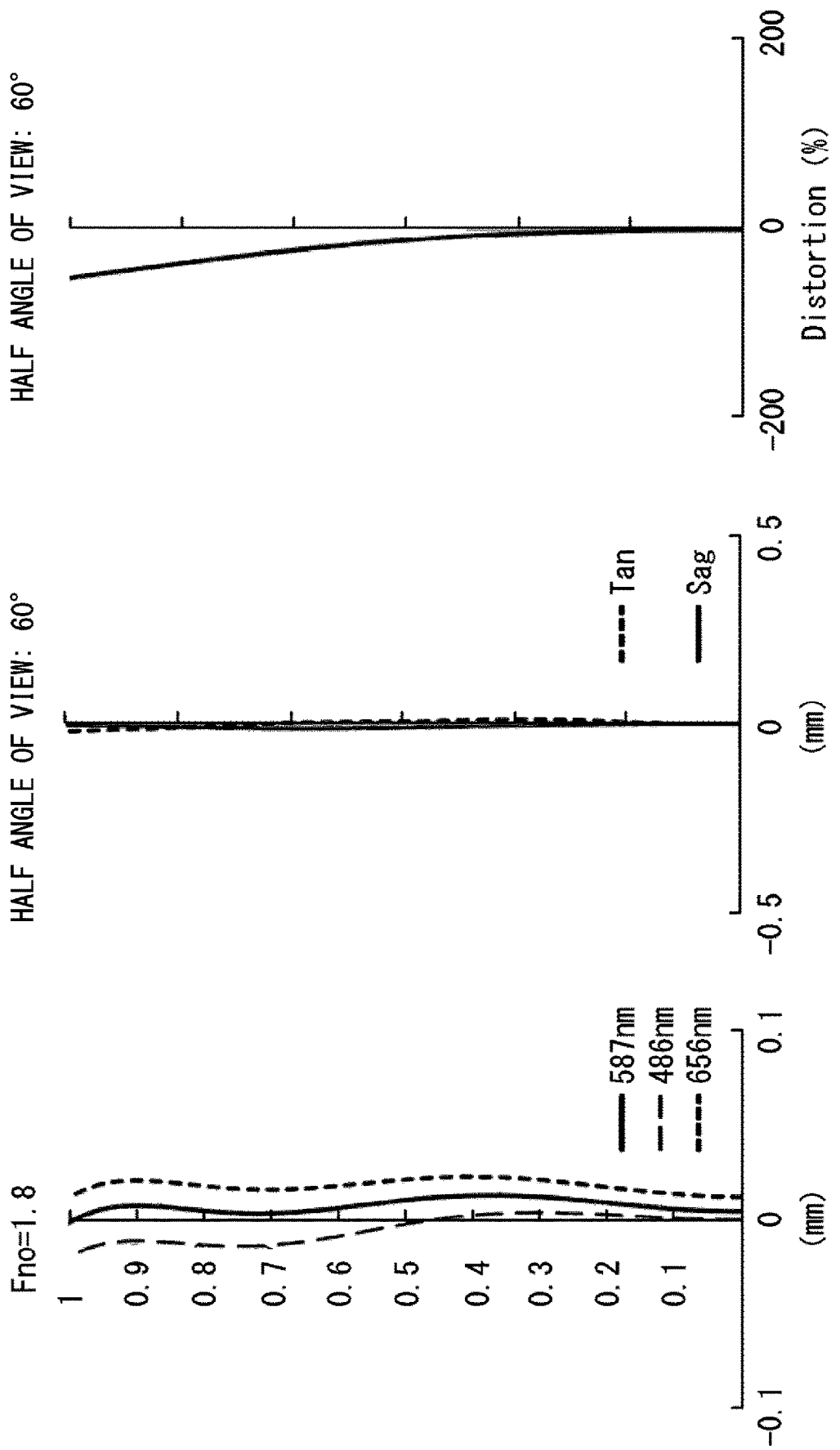
FIG. 9 is a longitudinal aberration graph, a field curvature graph, a distortion graph in the imaging lens system of Example 3.

FIG. 9 is a longitudinal aberration graph, a field curvature graph, a distortion graph in the imaging lens system of Example 3. As shown in FIG. 9, a half angle of view is 60°, and an F value is 1.8 in the imaging lens system 11 of Example 3. In the longitudinal aberration graph of FIG. 9, a horizontal axis represents a position where a light ray crosses the optical axis Z, and a vertical axis represents a height at a pupil diameter. The longitudinal aberration graph of the FIG. 9 shows simulation results using light rays having wavelengths of 587 nm, 486 nm, and 656 nm.

In the field curvature graph in FIG. 9, a horizontal axis indicates a distance in the Z direction of the optical axis, and a vertical axis indicates an image height (an angle of view). In the field curvature graph of FIG. 9, a symbol Sag indicates a curvature of field on a sagittal plane, and a symbol Tan indicates a curvature of field on a tangential plane. As shown in field curvature graph of FIG. 9, according to the imaging lens system 11 of the present example, the curvature of field is satisfactorily corrected. Accordingly, the imaging lens system 11 has a high resolution.

In the distortion graph of the FIG. 9, a horizontal axis represents the amount of image distortion (%), and a vertical axis represents an image height (angle of view). The field curvature graph and the distortion graph of FIG. 9 show simulation results using a light ray having a wavelength of 587 nm.

Next, Table 9 indicates a calculation result of characteristic values of the imaging lens system 11 of Example 3. When an overall focal length of the lens system is f, a focal length of the first lens L1 is $f_1$, a focal length of the second lens L2 is $f_2$, a focal length of the third lens L3 is $f_3$, a focal length of the fourth lens L4 is $f_4$, a focal length of the fifth lens L5 is $f_5$, a focal length of the sixth lens L6 is $f_6$, and a focal length of the seventh lens L7 is $f_7$ in the imaging lens system 11, Table 9 indicates these characteristic values (a combined focal power $f_{12}$ of the first lens L1 and the second lens L2 and a combined power $f_{56}$ of the fifth lens L5 and the

TABLE 8

| Example 3 | | | Aspherical coefficient | | | |
|---|---|---|---|---|---|---|
| | First surface | Second surface | Third surface | Fourth surface | Eighth surface | Ninth surface |
| k | −1.4246E+00 | −4.7159E−01 | 8.1373E−02 | 0.0000E+00 | 0.0000E+00 | 0.0000E+00 |
| A3 | 0.0000E+00 | 0.0000E+00 | 0.0000E+00 | 0.0000E+00 | 0.0000E+00 | 0.0000E+00 |
| A4 | −1.2635E−03 | −4.8794E−03 | 5.3443E−03 | 1.0878E−02 | 1.3928E−03 | 6.0082E−03 |
| A5 | 0.0000E+00 | 0.0000E+00 | 0.0000E+00 | 0.0000E+00 | 0.0000E+00 | 0.0000E+00 |
| A6 | −6.7415E−05 | −3.5548E−05 | −4.7721E−04 | −1.7793E−03 | 3.7756E−04 | 1.6178E−04 |
| A7 | 0.0000E+00 | 0.0000E+00 | 0.0000E+00 | 0.0000E+00 | 0.0000E+00 | 0.0000E+00 |
| A8 | 2.2843E−06 | 2.9980E−06 | 3.4516E−05 | 4.0000E−04 | −5.2177E−05 | 4.7092E−05 |
| A10 | 1.5675E−09 | 3.2885E−10 | −1.4918E−06 | −6.2348E−05 | 3.1434E−06 | −1.3673E−05 |
| A12 | 7.7444E−11 | 1.4275E−09 | 2.3419E−08 | 3.2942E−06 | 0.0000E+00 | 0.0000E+00 |
| A14 | −6.4126E−14 | 4.2353E−11 | 0.0000E+00 | 0.0000E+00 | 0.0000E+00 | 0.0000E+00 |
| A16 | 0.0000E+00 | 0.0000E+00 | 0.0000E+00 | 0.0000E+00 | 0.0000E+00 | 0.0000E+00 |
| | Tenth surface | Eleventh surface | Twelfth surface | Thirteenth surface | Fourteenth surface | Fifteenth surface |
| k | 0.0000E+00 | 1.5900E−01 | 1.5900E−01 | 0.0000E+00 | 0.0000E+00 | 1.0429E−01 |
| A3 | 0.0000E+00 | 0.0000E+00 | 0.0000E+00 | 0.0000E+00 | 0.0000E+00 | 0.0000E+00 |
| A4 | 1.3704E−03 | −9.2551E−03 | −8.2551E−03 | −2.6108E−03 | 3.2087E−03 | 7.7111E−03 |
| A5 | 0.0000E+00 | 0.0000E+00 | 0.0000E+00 | 0.0000E+00 | 0.0000E+00 | 0.0000E+00 |
| A6 | 5.7929E−04 | 4.3776E−03 | 4.3776E−03 | 3.4088E−05 | 3.4035E−04 | 1.9512E−04 |
| A7 | 0.0000E+00 | 0.0000E+00 | 0.0000E+00 | 0.0000E+00 | 0.0000E+00 | 0.0000E+00 |
| A8 | −1.3783E−04 | −1.0567E−03 | −1.0567E−03 | 5.9097E−05 | −1.5734E−05 | −2.4468E−05 |
| A10 | 1.7245E−05 | 1.0874E−04 | 1.0874E−04 | −7.2816E−06 | −6.6455E−06 | −4.2660E−06 |
| A12 | −2.0782E−06 | −5.6484E−06 | −5.6484E−06 | 2.8918E−07 | 2.6021E−07 | 3.6471E−07 |
| A14 | 0.0000E+00 | 0.0000E+00 | 0.0000E+00 | 0.0000E+00 | 2.8131E−10 | −1.2458E−10 |
| A16 | 0.0000E+00 | 0.0000E+00 | 0.0000E+00 | 0.0000E+00 | 0.0000E+00 | 0.0000E+00 | sixth lens L6), $f_{12}/f$, and $f_{12}/f_3$. Various focal lengths were calculated using a light ray having a wavelength of 587 nm.

TABLE 9

| Half angle of view | Example 3 60 |
|---|---|
| f1 | −52.5190 |
| f2 | −5.0780 |
| f12 | −4.8150 |
| f3 | 7.0900 |
| f4 | 8.3360 |
| f5 | −3.4400 |
| f6 | 4.2950 |
| f7 | 23.9330 |
| f45 | 477.6570 |
| f | 3.5120 |
| f12/f | −1.371 |
| f12/f3 | −0.679 |

In the imaging lens system of Example 3, an incident-side surface of the first lens L1 closest to the object side in the first lens group is an aspherical surface and has an inflection point, and thus the following conditional expression is satisfied.

$$0.31 \leq L1H/L1R \leq 0.65$$

L1H: distance from optical axis to inflection point in a direction perpendicular to the optical axis L1R: effective radius of incident-side surface of the first lens L1

L1SAG: sag amount at inflection point on incident-side surface of the first lens L1

Figure 10:
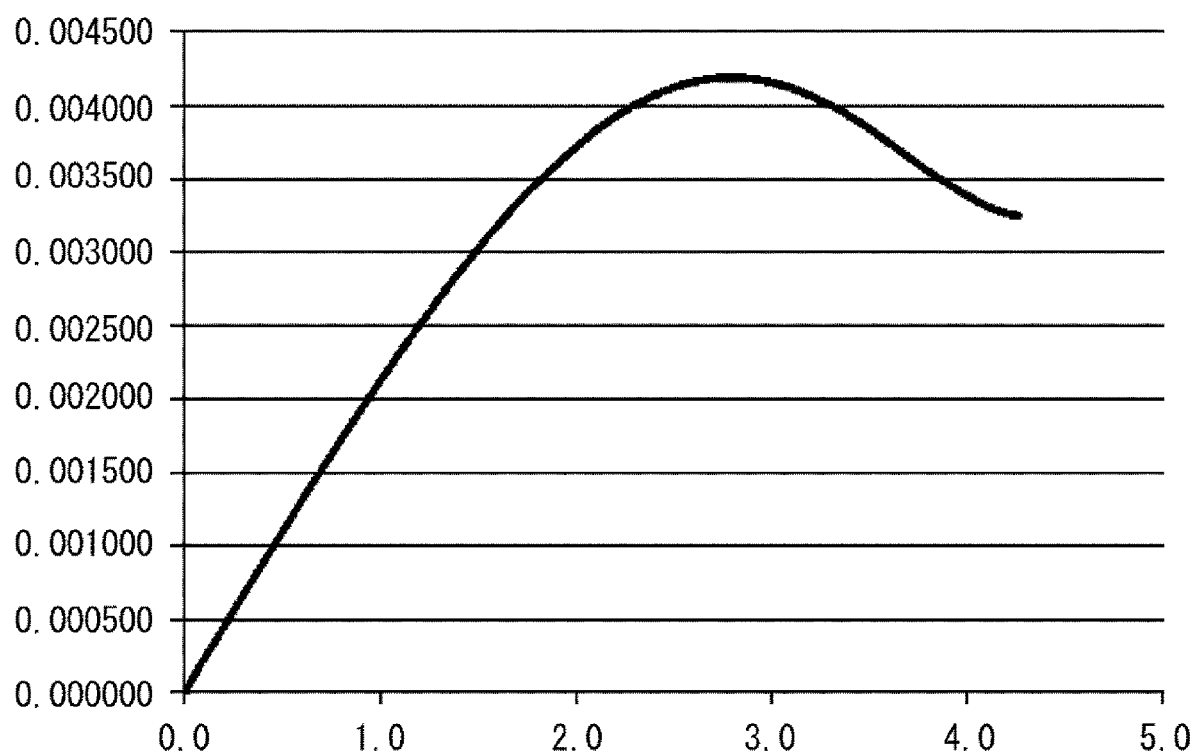
FIG. 10 is a graph showing a relation between a distance from a central optical axis and a differential value of the sag amount on an object-side lens surface of a first lens L1 of the imaging lens system in Example 3.

FIG. 10 is a graph showing a relation between a distance from a central optical axis and a differential value of the sag amount on the object-side lens surface of the first lens L1 of the imaging lens system in Example 3. In FIG. 10, a horizontal axis represents a distance in the perpendicular direction from the central optical axis, and a vertical axis represents a value obtained by differentiating the sag amount by the distance.

In the imaging lens system of Example 3 shown in FIG. 10, the first lens L1 has an effective radius of 4.48 mm and a position of an inflection point of 2.76 mm. Therefore, a value obtained by normalizing the position of the inflection point with the effective radius is 0.616, which satisfies the above expression.

Further, the imaging lens system of Example 3 satisfies the following conditional expression. In the imaging lens system of Example 3, the value of L1SAG is 0.717 and the value of L1SAG/L1R is 0.160.

$$0.03 \leq L1SAG/L1R$$

When the above expressions are satisfied, it is possible to ensure, with good balance, a region where the long-distance image in the central direction of the optical axis is captured with high resolution and a region where the neighborhood image is captured at a wide angle.

Example 4: Applicable Example to Imaging Device

Figure 11:
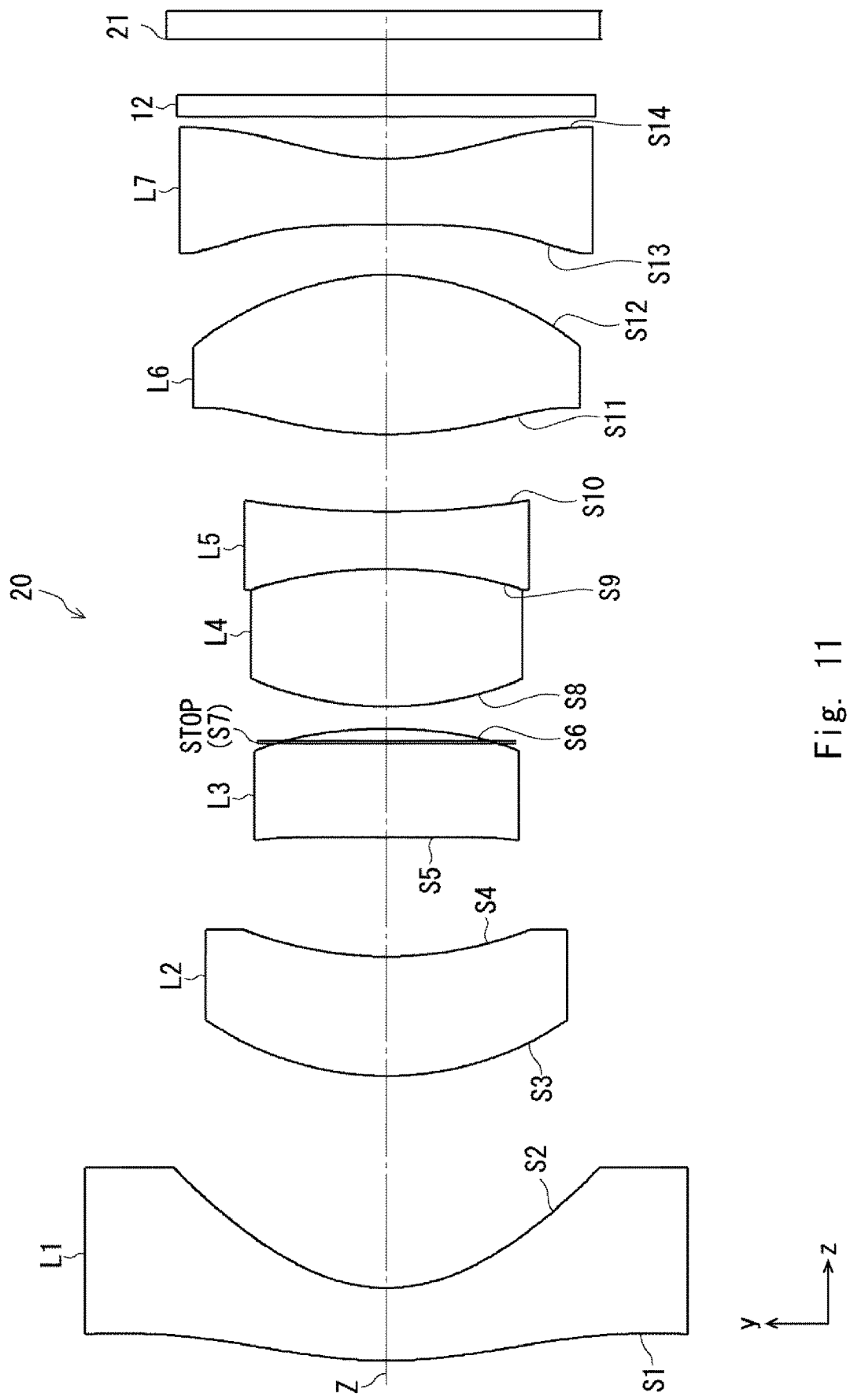
FIG. 11 is a cross-sectional view of an imaging device according to Example 4.

FIG. 11 is a cross-sectional view of an imaging device according to Example 4. An imaging device 20 includes an imaging lens system 11 and an imaging element 21. The imaging lens system 11 and the imaging element 21 are housed in a housing (not shown). The imaging lens system 11 is identical to the imaging lens system 11 described in Embodiment 1.

The imaging element 21 is an element that converts received light into an electric signal, and includes, for example, a CCD image sensor or a CMOS image sensor. The imaging element 21 is arranged at an image forming position of the imaging lens system 11. A horizontal angle of view is an angle of view of the imaging element 21 in a horizontal direction.

The present invention is not limited to the above-described embodiment, and can be appropriately changed without departing from the scope. For example, Example 4 may be applied to Embodiment 2 or 3.

This application is based upon and claims the benefit of priority from Japanese Patent Application No. 2017-217376, filed on Nov. 10, 2017, the entire contents of which are incorporated herein by reference.

REFERENCE SIGNS LIST 11 imaging lens system
12 cut filter
20 imaging device
21 imaging element
L1, L2, L3, L4, L5, L6, L7 lens

The invention claimed is:

1. An imaging lens system comprising, in order from an object side:
   a front group including a first lens, a second lens, and a third lens;
   an aperture stop; and
   a rear group including two or more lenses and having a positive combined power, wherein
   an image side of the first lens has a concave surface facing to an image side of the imaging lens system,
   a combined power of the first lens and the second lens is negative,
   the third lens is a lens having a positive power,
   an object side of the first lens has an aspherical surface, and
   an incident-side surface (object side) of the first lens has an inflection point, wherein the first lens is closest to an object side in the front group, and
   the imaging lens system satisfies $$0.31 \leq L1H/L1R \leq 0.65, \text{ and}$$

$$L1N \geq 1.75, \text{ where}$$

L1H is a distance from an optical axis to an inflection point in a direction perpendicular to the optical axis of the first lens,
   L1R is an effective radius of the incident-side surface of the first lens, and
   L1N is a refractive index of the first lens at a d-line.

2. The imaging lens system according to claim 1, wherein the imaging lens system satisfies $$0.03 \leq L1SAG/L1R$$

where L1SAG is sag amount at an inflection point on the incident-side surface of the first lens.

3. The imaging lens system according to claim 1, wherein the imaging lens system is a wide angle lens having an angle of view of 80 degrees or more.

4. The imaging lens system according to claim 1, wherein the first lens is a concave meniscus lens having a convex shape on the object side facing to an object side of the imaging lens system.

5. The imaging lens system according to claim 1, wherein the imaging lens system satisfies $$L1V \geq 38$$

where L1V is an Abbe number of the first lens at the d-line.

6. The imaging lens system according to claim 1, wherein an image side of a lens closest to an image side in the rear group is an aspherical surface having a concave shape facing to the image side of the imaging lens system.

7. The imaging lens system according to claim 1, wherein a lens closest to an object side in the rear group has a positive power.

8. The imaging lens system according to claim 1, wherein the rear group includes a cemented lens.

9. An imaging device comprising:

an imaging lens system according to claim 1; and an imaging element for capturing an image formed in the imaging lens system.

* * * * *